UNITED STATES PATENT OFFICE.

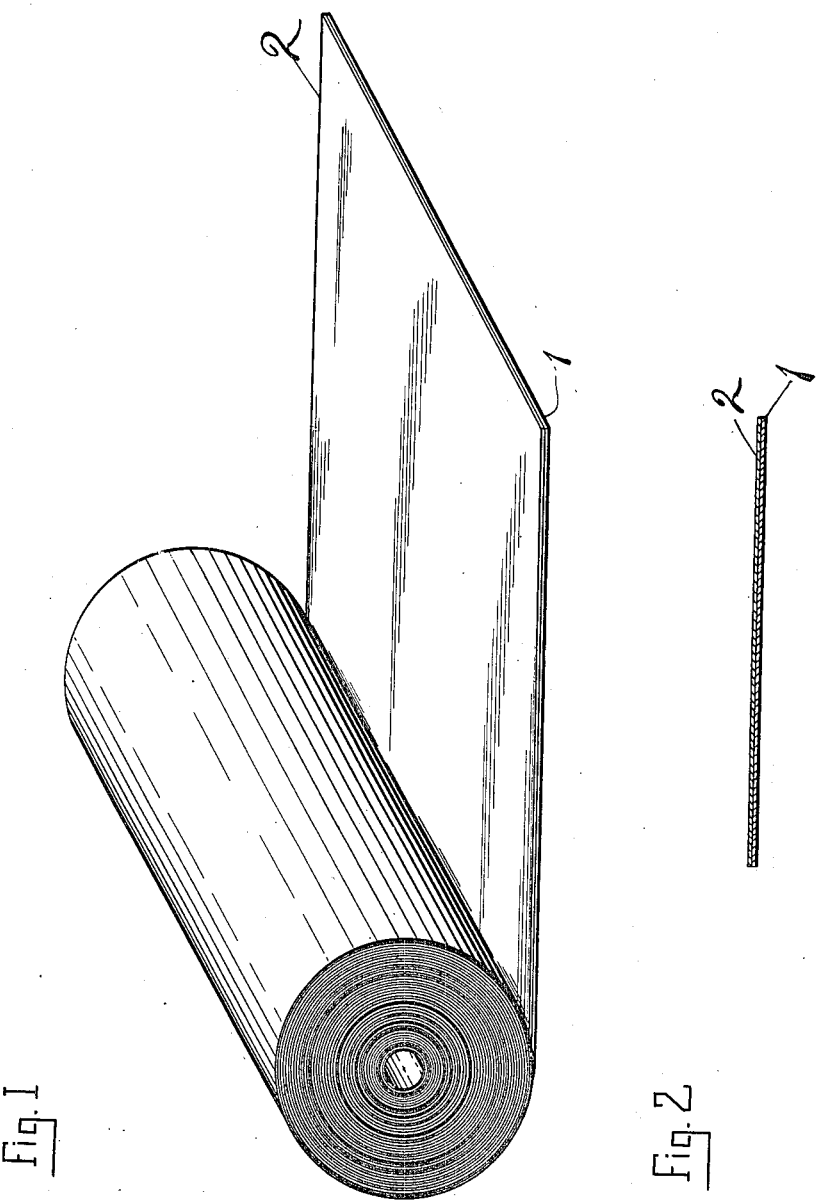

CHARLES A. KENWORTHY, OF NEW YORK, N. Y.

DUPLICATING-ROLL.

No. 831,614.

Specification of Letters Patent.

Patented Sept. 25, 1906.

Application filed January 25, 1906. Serial No. 298,371.

*To all whom it may concern:*

Be it known that I, CHARLES A. KENWORTHY, a citizen of the United States, and a resident of New York, State of New York, have invented new and useful Improvements in Duplicating-Rolls, of which the following is a specification.

My invention relates to hectograph duplicating rolls or sheets; and it has for its object to provide a roll or sheet that will be lasting in quality and one which cannot be torn except with great difficulty, and one from which the coating cannot be easily removed, and one wherein the gelatinous material will not curl, and yet one which can be stretched without tearing or breaking.

The invention consists in providing a glycerin and water proof cloth with a layer of a gelatinous matter known as a "hectograph composition" for producing duplicating-rolls. The substances are mixed together and heated and coated upon the water and glycerin proof cloth and are then allowed to harden. The glycerin-proof cloth prevents the glycerin from soaking through the cloth and prevents the glycerin from taking moisture of the air, which causes the cloth to become sticky on one side, and the cloth being waterproof prevents the moisture of the air from reaching the glycerin. The glycerin in the gelatinous composition is thus kept intact and the composition preserved, which greatly preserves the product.

My invention consists in other features shown in the drawings, set forth in the following description, and specified in the claims.

Referring to the drawings, Figure 1 illustrates a duplicating-roll embodying my invention. Fig. 2 illustrates a section of the sheet of which the roll is composed.

1 in the figures indicates the waterproof and glycerin-proof cloth. 2 indicates a layer of gelatinous matter, which when prepared is first liquid and plastic and when cool forms a somewhat hard gelatinous coating which firmly adheres to the glycerin-proof and waterproof cloth.

In my invention I use an oil-cloth to form the body or base of the roll. The oil-cloth is treated so as to make it glycerin-proof. The under side or raw side is treated with a mixture of linseed-oil and Japan drier. The raw side is painted over with the mixture and the oil-cloth is allowed to stand two or three days. A second coat of a mixture of linseed-oil and Japan drier is placed on the under or raw side of the oil-cloth and the cloth is allowed to stand for a considerable time. The coating thus formed on the under side of the oil-cloth is covered with a hot gelatinous combination containing glycerin. The same is then allowed to cool. When the composition is cool, the oil-cloth is placed on a smooth stone slab or table and ironed with a rapidly-moving and a very hot iron. This process renders the oil-cloth glycerin-proof and makes an article of manufacture whereby hectographing may be easily accomplished and without the attending objections due to blotting.

In all the other rolls made heretofore the glycerin will soak through the material forming the base of the roll and the gelatinous substance or composition becomes hardened. This greatly reduces the life of the roll and also reduces the number of copies that can be obtained therefrom. When the material forming the base of the rolls now known in the art is torn, the gelatinous material or composition separates itself from the base and it soon dries up. Moreover, the glycerin soaks up the base and rots it out, and thus becomes unfit for use.

In the product involving my invention the rolls can be stretched without breaking. The tendency of all the known articles of this class is to shrink or stretch in parts, so that when the same are placed on the table they will bulge and warp. If they are stretched to bring the same down flat on a flat operating-surface, they will tear and break and become destroyed. In my invention the material itself is never affected by the composition placed on its upper surface, and the material forming the body of the roll can be streched to any degree, so that the same can be brought down perfectly flat and smooth on a smooth surface, which enables the operator to use it with greater advantage and to obtain more perfect results.

Another feature of my invention is that it prevents the ink from passing through the roll itself and causing it to become weak at the places where the roll is inked. In the rolls now known in the art the ink passes through the material forming the body of the roll and causes the same to weaken at that point, and, moreover, covers the operating-table with ink, which makes it unpleasant to work with.

The invention may be modified by those skilled in the art without departing from the spirit thereof.

What I claim as new, and desire to secure by Letters Patent, is as follows:

1. A duplicating-roll consisting of a glycerin and waterproof cloth coated with a layer of a gelatinous composition.

2. A duplicating-roll consisting of a glycerin-proof oil-cloth having a coating of gelatinous composition.

3. A duplicating-roll consisting of a glycerin-proof oil-cloth having a coating of gelatinous composition on the raw side of the cloth.

In testimony whereof I have signed my name to this specification in the presence of two subscribing witnesses.

CHARLES A. KENWORTHY.

Witnesses:
F. F. CRAMPTON,
V. N. HOPPING.